US007000035B1

(12) United States Patent
Uchizono et al.

(10) Patent No.: US 7,000,035 B1
(45) Date of Patent: Feb. 14, 2006

(54) ELECTRONIC DEVICE WITH USB INTERFACE

(75) Inventors: Hideo Uchizono, Kawasaki (JP); Seiji Abe, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 718 days.

(21) Appl. No.: 09/786,560

(22) PCT Filed: Aug. 4, 2000

(86) PCT No.: PCT/JO00/05241

§ 371 (c)(1),
(2), (4) Date: Mar. 7, 2001

(87) PCT Pub. No.: WO01/11475

PCT Pub. Date: Feb. 15, 2001

(30) Foreign Application Priority Data

Aug. 6, 1999 (JP) .................................. 11-224701

(51) Int. Cl.
G06F 3/00 (2006.01)
G06F 13/00 (2006.01)
G06F 13/42 (2006.01)

(52) U.S. Cl. ........................ 710/2; 710/3; 710/8; 710/9; 710/105; 710/107

(58) Field of Classification Search ........ 710/104–106, 710/305, 9–10, 2–3, 19, 300, 304, 107
See application file for complete search history.

(56) References Cited

U.S. PATENT DOCUMENTS

| 5,841,424 A | 11/1998 | Kikinis |
| 6,122,676 A * | 9/2000 | Brief et al. ..................... 710/9 |
| 6,205,501 B1 | 3/2001 | Brief et al. |
| 6,216,188 B1 | 4/2001 | Endo et al. |
| 6,279,053 B1 | 8/2001 | Kubo |

FOREIGN PATENT DOCUMENTS

| DE | 199 00 369 A1 | 7/1999 |
| JP | 11-134486 | 5/1999 |
| JP | 11-203230 | 7/1999 |
| JP | 11-296315 | 10/1999 |
| JP | 2000-20463 | 1/2000 |
| JP | 2000-222337 | 8/2000 |
| WO | WO 9908196 A1 * | 2/1999 |

OTHER PUBLICATIONS

Robert Stuart, "Implementing an IrDA Control Peripheral", Sharp IrDA Application Note, [Feb. 3, 1999].*
Universal Serial Bus Specification, Revision 1.0, [Jan. 15, 1996].*
"USB Feature Specification: Shared Endpoints." Revision 1.0. SystemSoft Corporation and Intel Corporation. Oct. 27, 1999.*

(Continued)

*Primary Examiner*—Paul R. Myers
*Assistant Examiner*—Thomas J Cleary
(74) *Attorney, Agent, or Firm*—Brinks Hofer Gilson & Lione

(57) ABSTRACT

A mobile device 1 has a USB transmitter-receiver 3 having one or more interfaces formed by one or more endpoints for exchanging information via the USB, one or more logical devices 61 to 65 performing the exchanging of information with a host computer 2 via the USB transmitter-receiver, and a controller 4 which, when a function of one or more logical devices is used, selectsas many interfaces as required for the exchange of information between the logical device and the host computer2 from the one or more interfaces within the USB transmitter-receiver.

15 Claims, 10 Drawing Sheets

OTHER PUBLICATIONS

Robert Stuart, *Implementing an IrDA Control Peripheral*, Sharp IrDA Application Note, Feb. 3, 1999, available at http://www.irda.org/design/implement_control.pdf.

Robert Stuart, *An Introduction to IrDA Control*, Sharp IrDA Application Note, Aug. 31, 1998, available at http://www.irda.org/design/Intro_Control.pdf.

*LZ85202 IrDA Control Host Controller with USB Interface, User's Guide*, Sharp, 1999, available at http://www.ee.ualberta.ca/~ee401/IrDA_Control_Host.pdf.

Honda, Kazunari, et al., *New Interface Standard Adopted in Windows98/iMac: Method for Creating USB-enabled Device & Device Driver*, p. 80-84, Interface, CQ Publishing, Nov. 1, 1998.

* cited by examiner

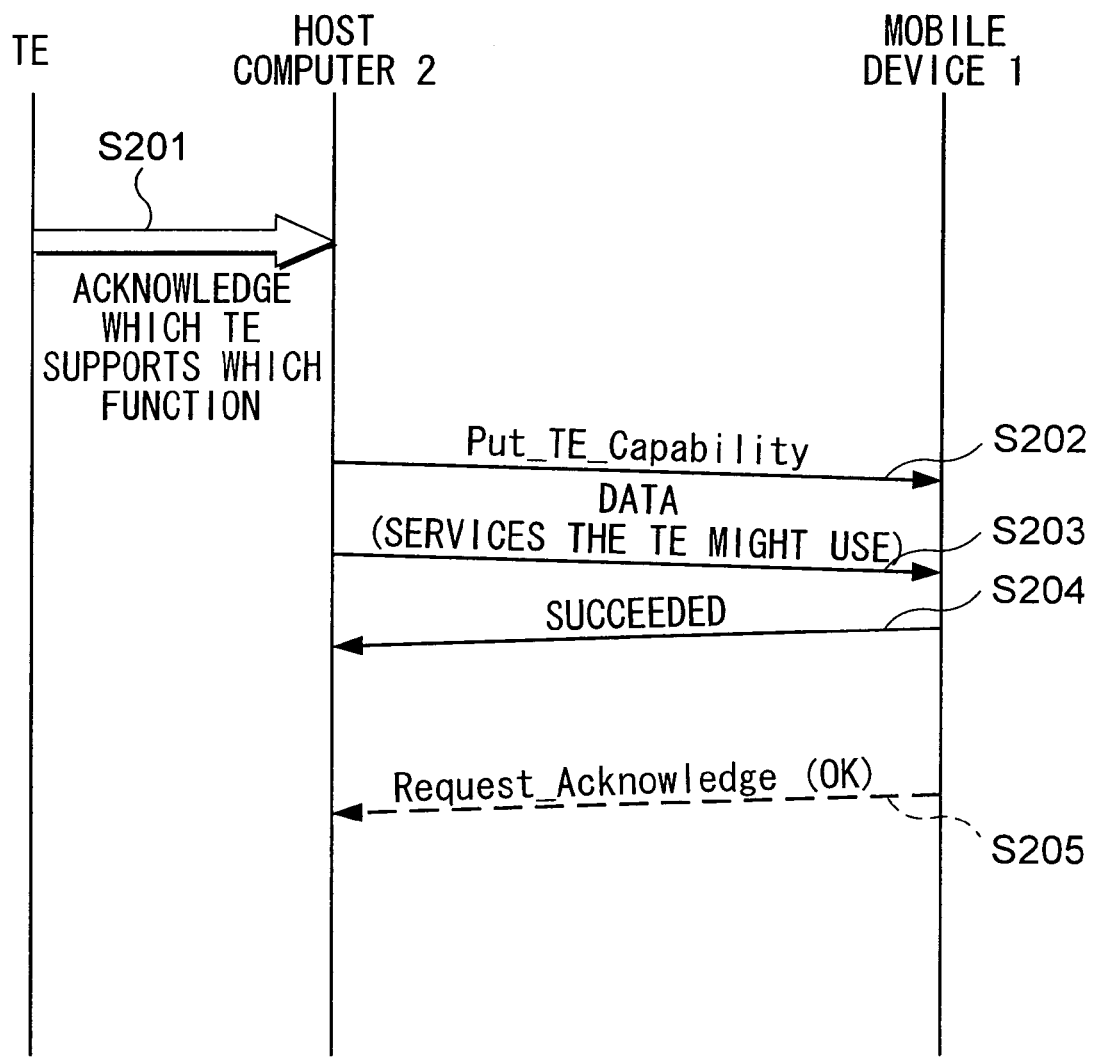

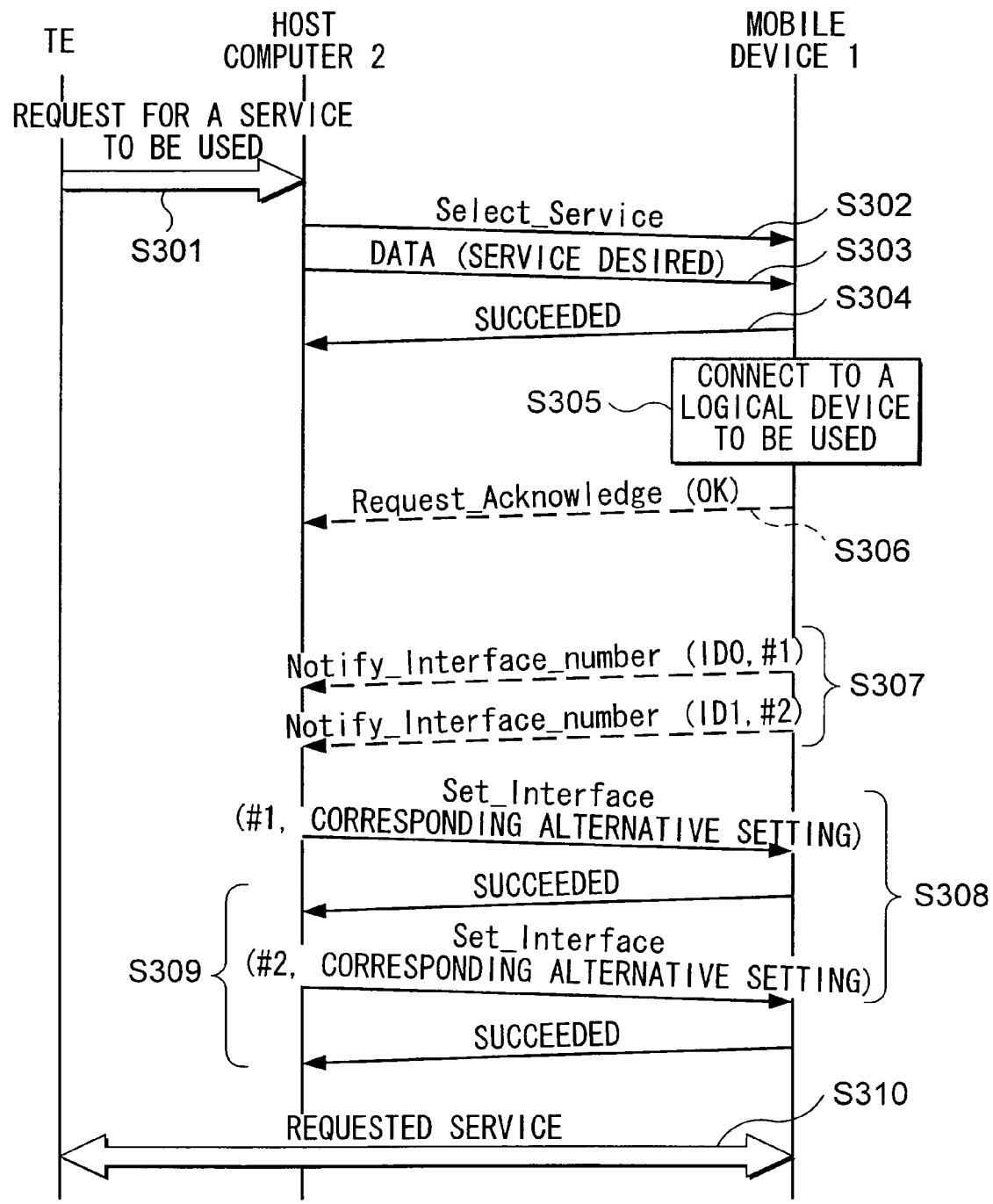

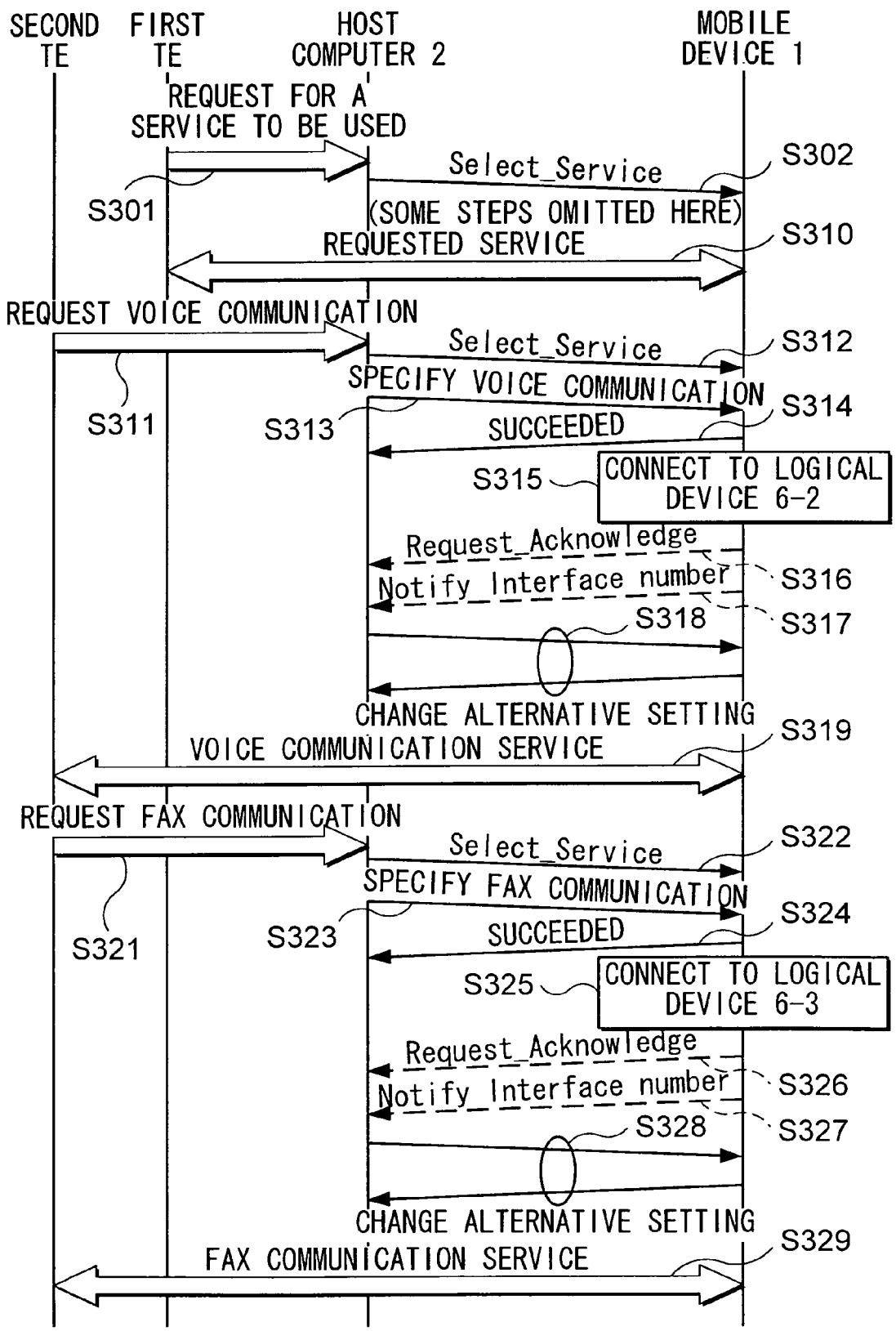

ELECTRONIC DEVICE WITH USB INTERFACE

TECHNICAL FIELD

The present invention relates to an electronic device with a USB interface.

BACKGROUND ART

The USB (Universal Serial Bus) is a bus for connecting a computer to various electronic devices. This USB is a cable bus that encompasses two signal lines and two power supply lines. Many personal computers and their peripheral devices have an interface conforming to the USB.

The USB interface was a devised with a premise of a system in which one or a plurality of devices are connected to one host computer. These devices connected to the host computer via the USB are generally called USB devices.

When a USB device is connected to the host computer, the host computer assigns a unique address to the USB device. In addition, the USB device has a plurality of endpoints for terminating a communication between the USB device and the host computer. The host computer handles communication with these endpoints of the USB device.

A study is underway with regard to a compact portable electronic device with a plurality of functions. When connecting such a multifunctional portable electronic device to a host computer using a USB interface, it is necessary to provide a fixed endpoint for each function within the portable electronic device. However, the provision of such an endpoint for each function is not desirable in a portable electronic device that needs to be compact. There is also a situation that there is not such a great need to simultaneously use a plurality of functions in such portable electronic devices.

DISCLOSURE OF THE INVENTION

The present invention was made in consideration of the above-described situation, and has an object to provide an electronic device capable of providing a plurality of functions via a Universal Serial Bus(USB), using a small number of compact interfaces.

To achieve the above-noted object, the present invention provides an electronic device having a USB transmitter-receiver with at least one endpoint performing a transfer of information via a USB, a device section including at least one logic device performing a transfer of information with a host computer via the USB transmitter-receiver, and a controller which, when the host computer uses a desired logical device in the device section, selects an endpoint required for a transfer of information between the logical device and the host computer out of the endpoints within the USB transmitter-receiver and makes a connection to the logical device.

BRIEF DESCRIPTION OF THE DRAWINGS

FIG. 6 is a sequence diagram showing the operation of the second embodiment of the present invention.

FIG. 7 is a sequence diagram showing the operation of the second embodiment of the present invention.

FIG. 9 is a sequence diagram corresponding to the operational examples of FIG. 8A, FIG. 8B, and FIG. 8C

BEST MODE OF CARRYING OUT THE INVENTION

Preferred embodiments of the present invention are described below, with reference to the drawings.

[1] First Embodiment

[1.1] Configuration of the Embodiment

Figure 1:
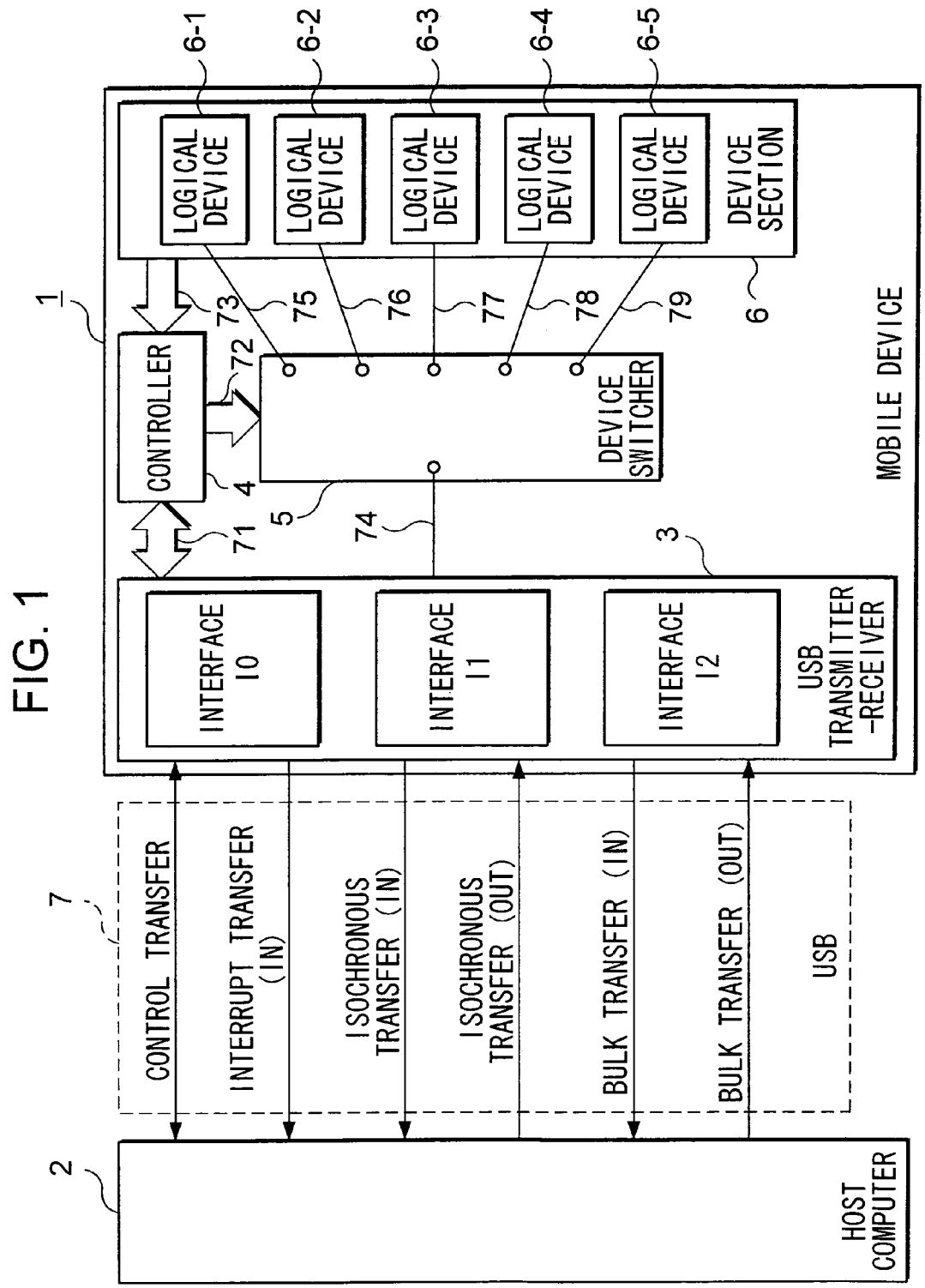
FIG. 1 is a block diagram showing a configuration of a communication system including a mobile device according to a first embodiment of the present invention.

FIG. 1 is a block diagram of a communication system including a mobile device 1, which is a first embodiment of the present invention. As shown in FIG. 1, this communication system is formed by connection between the mobile device 1 and a host computer 2 by means of a USB cable 7. The mobile device 1, for example, is a multifunctional portable electronic device and has a USB transmitter-receiver 3, a controller 4, a device switcher 5, and a device section 6.

The USB transmitter-receiver 3 has three interfaces, I0 to I2. Each of the interfaces is assigned an interface number that can be identified within the USB transmitter-receiver 3, in this case the interface I0 numbered #0, the interface I1 numbered #1, and the interface I2 numbered #2. The interfaces I0 to I2 are described later in detail.

The USB transmitter-receiver 3 is connected to the controller 4 by the connection line 71, and connected to the device switcher 5 by the connection line 74.

The device section 6 has a plurality of logical devices 6-1 to 6-5, each logical device being connected to the device switcher 5 by the connection lines 75 to 79. These logical devices can be such devices as a voice communication device, a packet communication device, a telephone directory exchange device, an unlimited digital communication device, a printer, and a modem.

The device switcher 5 is a selection switch that selects one of the connection lines 75 to 79, and connects the selected line with the connection line 74. For example, if the connection line 75 is selected, the host computer 2 can communicate with the logical device 6-1 via the USB transmitter-receiver 3, the connection line 74, and the connection line 75.

The controller 4 is connected to the device switcher 5 by the connection line 72 and connected to the device section 6 by the connection line 73. The controller 4 stores the following types of information:

<1> a list of functions of the logical devices 6-1 to 6-5;

<2> interface alternative setting values required for use of each logical device and <3> information of the USB interface at the mobile device 1, such as the number of interfaces, the interface numbers, the number of endpoints, and the endpoint numbers The controller 4 can notify the host computer 2 of the above-noted function information, via the USB transmitter-receiver 3 and the USB cable 7. The controller 4 receives an instruction of a desired function from the host computer 2 via the USB cable 7 and the USB transmitter-receiver 3, and can perform switching control for connecting to the host computer 2 a logical device within the device section 6 corresponding to that function. Details of this switching control are described later.

Figure 2:
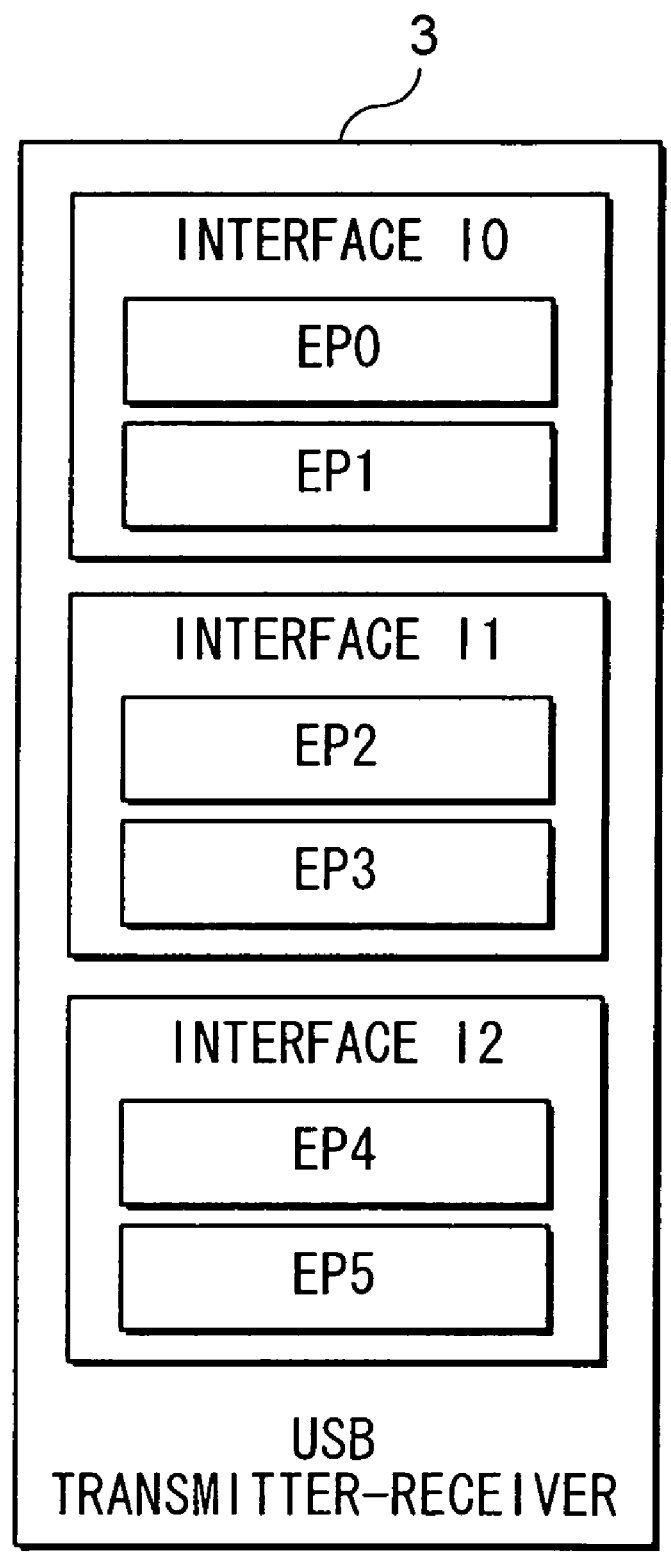
FIG. 2 is a block diagram showing a configuration of a USB transmitter receiver in the first embodiment of the present invention.

FIG. 2 is a block diagram showing the basic configuration of the USB transmitter-receiver 3.

In FIG. 2, the USB transmitter-receiver 3 shown is formed of three interfaces, I0 to I2. These interfaces I0 to I2 each has two endpoints (hereinafter abbreviated EP).

The EP is a basic unit making up the USB interface at the mobile device 1, and various types of EPs are used to accommodate various forms of data transfer. Each EP has a unique identification number (EP number) within the USB device (the mobile device 1 in this embodiment), by which each EP can be identified. Depending upon an interface, it is possible to treat a plurality of endpoints as a group.

The following description is with regard to the interfaces I0 to I2. In the description below, "IN" refers to the transfer direction from the USB device (mobile device 1 in this embodiment) to the host computer, and "OUT" refers to the transfer direction from the host computer to the USB device.

(a) Interface I0

Interface I0 has endpoints EP0 and EP1, which have the following functions.

First, EP0 is an endpoint used for a control transfer. This is used in a setup that is performed when the USB device and the host computer are connected to each other to communicate. The setup performed using EP0 is described later in detail.

Next, EP1 is an endpoint used for an interrupt transfer. EP1 is used in an IN-direction interrupt transfer of various notifications from the USB device to the host computer.

(b) Interfaces I1 and I2

Interface I1 has EP2 and EP3, and interface I2 has EP4 and EP5.

EP2 to EP5 can be used for either a bulk transfer or an ISO (isochronous) transfer. It is also possible to switch a type of data transfer performed by these endpoints from a bulk transfer to an ISO transfer, and from an ISO transfer to a bulk transfer. Additionally, it is possible within an ISO transfer to perform switching of the data transfer amount.

The switching of the data transfer type among EP2 to EP5 is performed by using alternative settings of the interface.

In this embodiment, the alternative settings of the interface are defined as follows Alternative setting 0. Bulk transfer IN/OUT mode (64 bytes)

Alternative setting 1. ISO transfer IN/OUT mode (8 bytes)

Alternative setting 2. ISO transfer IN/OUT mode (16 bytes)

Alternative setting 3. ISO transfer IN/OUT mode (32 bytes)

Alternative setting 4. ISO transfer IN/OUT mode (64 bytes)

Alternative setting 5. ISO transfer IN/OUT mode (128 bytes)

By means of the above-noted arrangement, it is possible for each interface to correspond to client applications.

[1.2] Operation of the Embodiment

Figure 3:
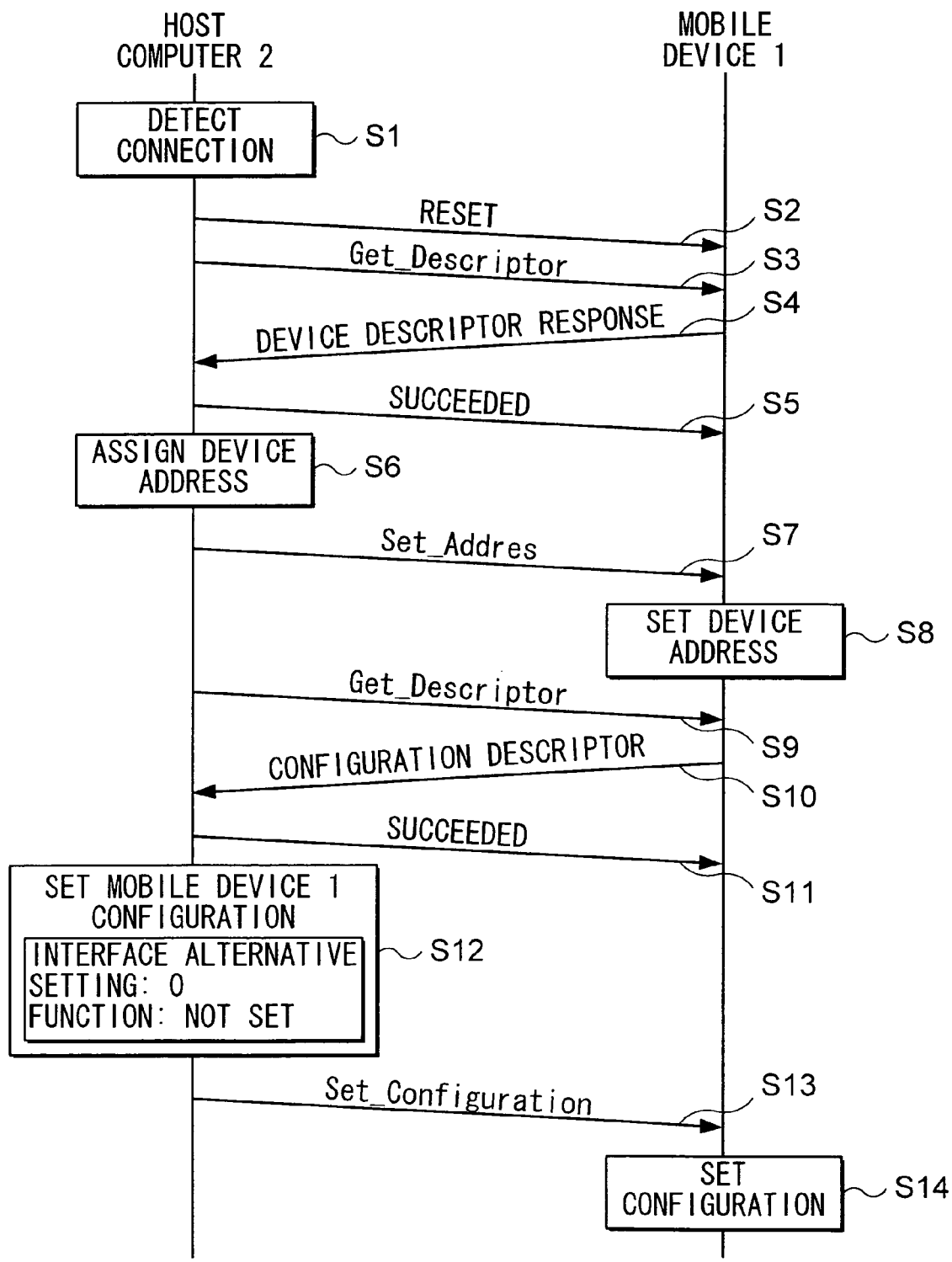
FIG. 3 is a sequence diagram showing the operation of the first embodiment of the present invention.

FIG. 3 is a sequence diagram showing the setup procedure performed between the host computer 2 and the controller 4 of the mobile device 1 when the mobile device 1 is connected to the host computer 2 by the USB cable 7.

The host computer 2, when it detects the connection of the mobile device 1 (step S1), sends a reset signal, via the USB cable 7, to the USB transmitter-receiver 3 within the mobile device 1 (step S2). The USB transmitter-receiver 3 of the mobile device 1 receives this reset signal and sends it to the controller 4. The controller 4, by receiving this reset signal, is initialized, thereby enabling it to respond to a transaction. When the resetting of the mobile device 1 in this manner is completed, a default pipe is formed between the host computer 2 and EP0 in the mobile device 1, enabling a control transfer via the default pipe.

The host computer 2 then starts setting-up the mobile device 1. First, the host computer 2 starts a control transfer with EP0 of the mobile device 1. At the setup stage of this control transfer, the host computer 2 transmits a Get Descriptor so as to request a device descriptor (step S3). Next, the controller 4 of the mobile device 1 at the data stage of the control transfer sends the device descriptor to the host computer 2 (step S4). The host computer 2 in the status stage of the control transfer sends a length 0 data packet addressed to the EP0 of the mobile device 1, thereby notifying that the descriptor has been received normally (step S5).

The device descriptor sent to the host computer 2 in this manner has general information with regard to the mobile device 1. This general information includes such information as a protocol code of the mobile device 1 and the maximum packet size of the EP0.

When the host computer 2 receives this device descriptor, it assigns a unique address (hereinafter referred to as the device address) to the mobile device 1 (step S6). After the host computer 2 completes the assignment of the device address, it sends a Set Address command to the mobile device 1, thereby reporting thereto of the device address (step S7). By doing this, the device address is set at the mobile device 1 (step S8).

After the device address setting is completed, the host computer 2 again sends Get Descriptor to the controller 4 of the mobile device 1 in the setup stage, to request the configuration descriptor from the controller 4 (step S9). When it receives the Get Descriptor, the controller 4 in the data stage sends a configuration descriptor to the host computer 2 (step S10). The host computer 2 in the status stage sends a length 0 data packet addressed to EP0, thereby giving notification that the descriptor was received normally (step S11).

The configuration descriptor sent to the host computer 2 from the controller 4 in this manner includes the following information among the information stored in the controller 4.

<1> A bit map table including a functional list of the logical devices 6-1 to 6-5 within the mobile device 1, which, by receiving, enables the host computer 2 to learn the functional configuration of the logical devices 6-1 to 6-5 within the mobile device 1.

<2> Information about the USB interface at the mobile device 1, such as the number of interfaces, the interface numbers, the number of endpoints, and the endpoint numbers.

After receiving this configuration descriptor, the host computer 2 learns the relationship between each endpoint number and the interface numbers, and sets the configuration of the mobile device 1 in the following manner. (step S12).

First, the host computer 2 initializes information regarding the EP and the interface configuration of the mobile device 1 stored in a memory, not shown. Here, the alternative settings are set 0 for both I1 and I2.

The host computer 2 subsequently performs an initialization of information with regard to a logical device to be used. When doing this, the host computer 2 does not specify which logical device to use among the logical devices 6-1 to 6-5 within the mobile device 1, but performs an initialization of information with regard to the logical devices so that, when a logical device to be used is subsequently determined, the setting can be changed accordingly.

Next, the host computer 2 in the setup stage of the control transfer sends Set Configuration (step S13), thereby making a request to perform setting of functions of the interface as they were set at the step S12. The controller 4 of the mobile device 1, in response to this Set Configuration command, performs the setting of the interface (step S14).

Thus, the setup of the mobile device 1 is completed

Figure 4:
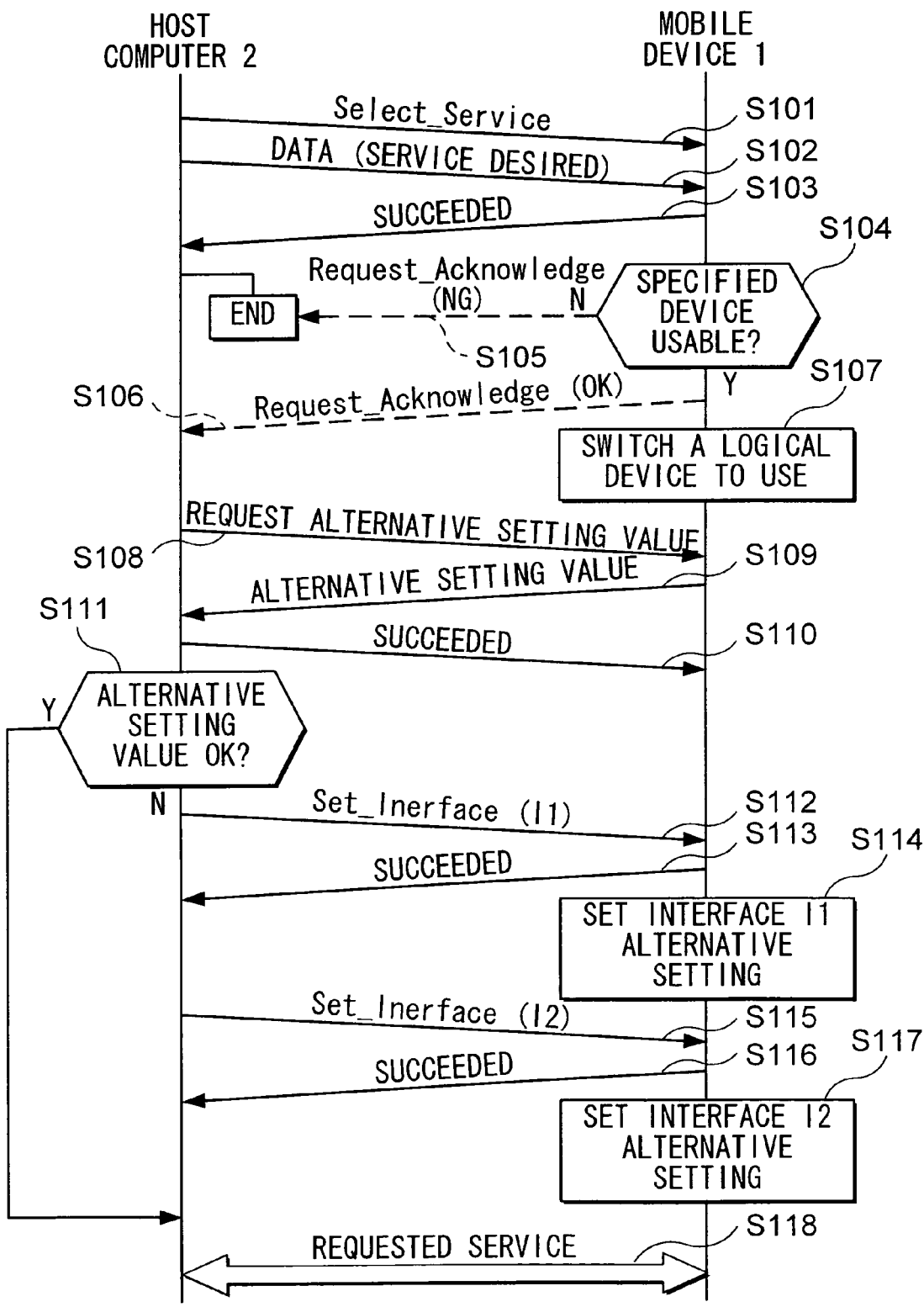
FIG. 4 is a sequence diagram showing the operation of the first embodiment of the present invention.

FIG. 4 is a sequence diagram showing an operation in a case that a request to use one of the logical devices is made from the host computer 2. In this sequence, the host computer 2 is supposed to use the logical device 6-1.

First, the host computer 2 starts a control transfer addressed to EP0 of the mobile device 1, and in the setup stage thereof sends Select_Service (step S101). This Select_Service is a command requesting for a desired service. Next, the host computer 2, in the data stage, sends data that specifies a logical device within the mobile device 1 corresponding to the requested service to the mobile device 1 (step S102). When the controller 4 thus receives a notification message regarding the requested service and also a notification message that the device to be used is the logical device 6-1, in the status stage, it notifies to the host computer 2 that the data was received normally (step S103).

Next, the controller 4 makes a judgment as to whether the logical device 6-1 is available or not (step S104). If at this point the logical device 6-1 is not available the controller 4, by means of an interrupt transfer using the interface I0 (EP1), sends a Request_Acknowledge, which includes the information to that effect, to the host computer 2 (step S105). By doing this, at the host computer 2, the user is notified of the refusal of the requested service, and the processing is terminated.

In contrast to the above, if the logical device 6-1 is available, the controller 4, by means of an interrupt transfer using the interface I0 (EP1), sends a Request_Acknowledge, which includes the information to that effect, to the host computer 2 (step S106). Next, the controller 4 outputs a command to the device switcher 5 to the effect that a connection should be made between the connection line 75 corresponding to the logical device 6-1, for which the use was requested, and the connection line 74. When this command is received, the logical device switcher 5 makes a connection between the connection line 74 and the connection line 75 (step S107).

At the host computer 2, when the Request_Acknowledge indicating the availability of the logical device 6-1 is received, in the setup stage of the control transfer, a request is made to the mobile device 1 for an interface alternative setting value corresponding to the logical device 6-1 which is to be used (step S108).

When this request for the alternative setting value is received, the controller 4 of the mobile device 1, in the data stage, sends the interface alternative setting value required for using the logical device 6-1 to the host computer 2 (step S109).

Upon receiving this alternative setting value, the host computer 2 notifies the mobile device 1, in the status stage, to the effect that the transmission has succeeded (step S110).

Upon receiving this alternative setting value, the host computer 2 makes a judgment as to whether, in receiving the service, the alternative interface setting value notified by the mobile device 1 can be left a sit is (step S111).

If there is no problem with the alternative setting value as a result of the judgment at step S111, a buffer area corresponding to EP2 to EP5 of the mobile device 1 is formed, comparable to a host buffer, and a pipe is formed between the host buffer and each of the EPs of the mobile device 1. After that, the host computer 2 starts communication corresponding to the requested service between itself and the connected logical device 6-1 of the mobile device 1 (step S118).

If the alternative interface setting value is not satisfactory as a result of the judgment at step S111, the host computer 2, in the setup stage of control transfer with EP0 of the mobile device 1, sends Set Interface, thereby making a request to the controller 4 to switch the alternate setting of each EP (steps S112 and S115). On receiving this Set Interface command, the mobile device 1 first gives notification in the status stage that the request transmission has succeeded (steps S113 and S116), after which the alternative settings of each interface are switched, each EP being set to the status corresponding to those alternative setting values (steps S114 and S117).

For example, if the service to be used is an ISDN communication service, for a Q921/Q931 communication, an interface (for example, interface I1) is set to the alternative setting 0 for bulk transfer, and for a B channel communication, another interface (for example, interface I2) is set to the alternate setting 2 for ISO transfer. Thus, it is possible to perform data communication on two channels. However, if a data transfer capacity of 32 or more bytes is required for an ISO transfer, the alternate setting would be in the range 3 to 5. For this reason, in this example the host computer 2 would make a request to switch the interface I2 alternative setting to a value from 3 to 5, and when this request is received the controller 4 switches the alternative setting of the interface I2.

In this manner, when the switching of the alternative settings of each interface is completed, a pipe is formed between the host buffer and the EP. The host computer 2 then starts communication corresponding to the requested service, between itself and the connected logical device 6-1 of the mobile device 1(step S118).

When a voice communication device or a modem is used as the logical device 6-1, it is sufficient to have one pair of EPs for IN/OUT. For this reason, it is possible to use the desired logical device, using one interface instead of two.

Thus, it is possible to reduce the number of EPs according to the mobile device 1 of this embodiment, because it is sufficient to have one USB interface for a plurality of logical devices.

The following variation of this embodiment can be envisioned. Specifically, at step S10 of the setup operation as shown in FIG. 3, the alternative interface setting values required for the use of each logical device are sent from the mobile device 1 to the host computer 2 for all logical devices within the mobile device 1. If this is done, in the sequence shown in FIG. 4, in which the host computer is to use a desired logical device, it is possible to omit the process (steps S108 and S109) for the host computer 2 to receive the alternative value for the logical device to be used from the mobile device 1.

[2] Second Embodiment

[2.1] Configuration of the Embodiment

Figure 5:
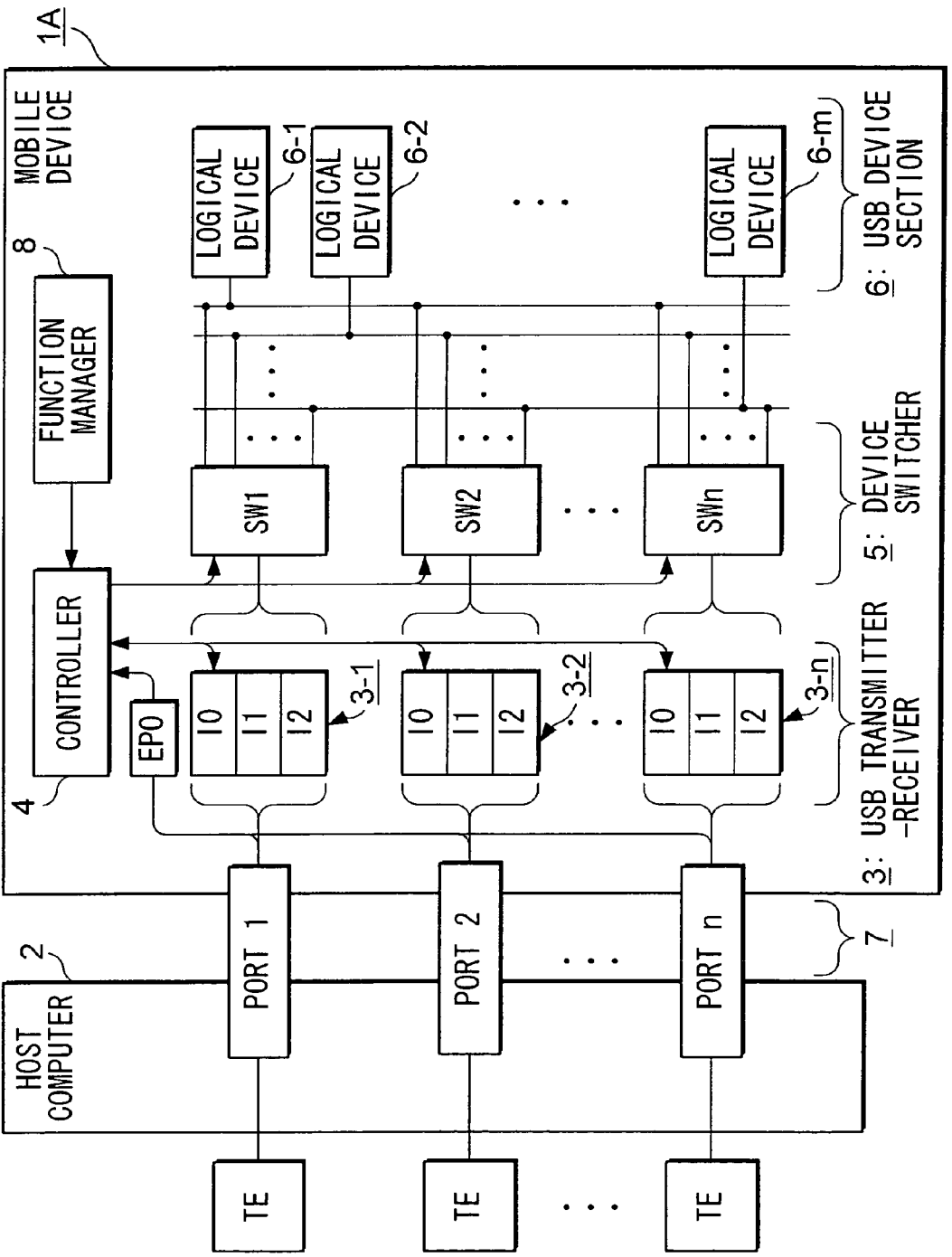
FIG. 5 is a block diagram showing a configuration of a communication system including a mobile device according to a second embodiment of the present invention.

FIG. 5 is a block diagram showing the configuration of a communication system including a mobile device 1A according to a second embodiment of the present invention. In this drawing, parts corresponding to parts in FIG. 1 are assigned the same reference numerals. In this communication system, the mobile device 1A has mumber of ports. Each of these ports is not a physically independent transmission path, but rather corresponds to a communication channel that joins the host computer 2 and the mobile device 1A. All of the ports physically use a single USB cable.

One or a plurality of TE(terminal equipments are connected to the host computer 2. Each TE can be a standalone hardwire that is physically independent from the host computer 2, and can alternatively bean application software installed in the host computer 2. Each TE can select one of the ports in the mobile device 1A and can use a logical device within the mobile device 1A via this port.

The internal configuration of the mobile device 1A in this embodiment is described below. The USB transmitter-receiver 3 of the mobile device 1A is made up of interface blocks 3-1 to 3-n corresponding to n number of ports and an endpoint EP0 shared by all the ports for a control transfer. The interface blocks 3-k (where k=1 to n) have interfaces I0, I1, and I2. The interface I0 has EP1, the interface I1 has EP2 and EP3, and the interface I2 has EP4 and EP5. The functions of each endpoint are as described with regard to the first embodiment.

The interfaces I1 and I2 of the interface blocks 3-k corresponding to each port are assigned identifiers ID0 and ID1 each for identifying thereof among the ports.

Each of the interfaces is assigned an interface number that can be identified in the USB transmitter-receiver 3: the interface I0 of the interface block 3-1 being #0, the interface I1 of the interface block 3-1 being #1, the interface I2 of the interface block 3-1 being #2, the interface I0 of the interface block 3-2 being #3, and so on.

The device switcher 5 is formed by switches SW1 to SWn, corresponding to the n number of ports. Switches SWk corresponding to each port connects an interface block 3-k to one of the logical devices within the USB device 6. Which logical device is to be connected to the interface block 3-k is controlled by the controller 4.

A function manager 8 is a means to monitor how each logical device 6-k (where k=1 to m) is used within the USB device 6 and to manage the available logical devices for every port. In a case of the configuration shown in FIG. 5, when no logical devices are being used, in using any of the ports, it is possible to select and use a desired logical device among all the logical devices.

[2.2] Operation of the Embodiment

The operation of this embodiment is discussed below.

When the mobile device 1A is connected to the host computer 2 by the USB cable 7, initialization by a prescribed procedure is performed both at the mobile device 1A and the host computer 2. In this initialization, the host computer 2 assigns one address to the mobile device 1A. At the mobile device 1A, the alternative settings of all interfaces are set to 0. A descriptor is sent from the mobile device 1A to the host computer 2.

This descriptor includes the following two pieces of information for each port.

a. Lists of available functions by each port

In the configuration shown in FIG. 5, each of the functions of the logical devices 6-1 to 6-n would be sent as a list of available functions for each port. Instead of making all the logical devices available for each port, logical devices used at each of the ports may be different from one another, in which case a separate function list is sent for each port individually.

b. The number of interfaces and their alternative settings for the ports

By receiving these data, the host computer 2 can learn the correspondence, for each port, between interface numbers and endpoints used at each interface, as shown in the example below.

EXAMPLE

| | | |
|---|---|---|
| Port 1 | Interface number 1 | EP1 |
| | Interface number 2 | EP2 |
| | Interface number 2 | EP3 |
| | Interface number 3 | EP4 |
| | Interface number 3 | EP5 |
| Port 2 | Interface number 4 | EP6 |
| | Interface number 5 | EP7 |
| | Interface number 5 | EP8 |
| | Interface number 6 | EP9 |
| | Interface number 6 | EP10 |
| | (Further entries omitted) | |

Assuming that a TE is connected to the host computer 2, the operational sequence of this embodiment is as shown in FIG. 6.

In this case, the TE connected to the host computer 2 gives notification to the host computer 2 of the functions supported by the TE (step S201). Next, the TE selects one of the ports (for example, the port k) at the mobile device 1A.

Next, the host computer 2 starts a control transfer with the EP0 within the mobile device 1A and, in the setup stage thereof, sends Put_TE_Capability (step S202). This Put_TE_Cability is a command giving notification of the services that the TE might use, and an interface number corresponding to the port k selected by the TE is included therein. Next, the host computer 2, in the data stage, sends data to the mobile device 1A that indicates the service that the TE might use (step S203).

Next, the controller 4 of the mobile device 1A, in the status stage, sends notification to the host computer 2 that the transmission of the Put_TE_Capability and the data following thereafter succeeded (step S204).

Next, the controller 4 is notified by the interface number in the command received at step S202, of that the port selected by the TE is port k, and inquires of the function manager 8 as to whether it is possible, using the port k, to use a logical device corresponding to the service which notified at step S203. In a case that the port k can be used so as to use the logical device corresponding to the service, an interrupt transfer using the interface I0 corresponding to port k is used to send a Request Acknowledge to the host computer 2 (step S205).

Next, referring to the operational sequence shown in FIG. 7, the operation of this embodiment up until the TE receives the service by the logical device within the mobile device 1A is described below.

First, the TE requests a desired service from the host computer 2 (step S301). Upon receiving this request, the host computer 2 performs a control transfer to the EP0 within the mobile device 1A. In this control transfer, in the setup stage, Select_Service is sent (step S302). This Select_Service includes one of the interface numbers corresponding to the port k used by the TE. Next, in the data stage, data that specifies the service requested at step S301 is sent(step S303).

Next, the controller 4 of the mobile device 1A, in the data stage, gives notification to the host computer 2 that the service request transmission has succeeded (step S304).

Next, the controller 4 of the mobile device 1A makes a judgment, based on the interface number in the command received at step S302, as to whether the TE is using port k and inquires of the function manager 8 as to whether it is possible to use the logical device corresponding to the service which notified at step S303 at port k or not. In a case in which it is possible to use the logical device corresponding to the requested service, the controller 4 sends a command to the switch SWk corresponding to the port k, so as to connect the logical device to the interface block 3-k which corresponds to the port k (step S305).

The controller 4 then performs an interrupt transfer using the interface I0, corresponding to the port k, to return a Request Acknowledge to the host computer 2 (step S306).

Next, the controller 4, in the interrupt transfer using the interface I0 corresponding to the port k, sends Notify_Interface_Number, which includes the identifiers and interface numbers of each interface used in the service, to the host computer 2 (step S307).

Next, the host computer 2, makes a judgment as to whether, in receiving the service via the port k, it is necessary to perform alternative settings for each interface or not. If it is necessary, a control transfer addressed to the EP0 within the mobile device 1A is started and, in the setup stage thereof, Set_Interface is sent for the purpose of making alternative settings (step S308). This Set_Interface includes an interface number of the interface for which an alternative setting is to be made and an alternative setting value specifying a type of data transfer, an amount of data that can be transferred, and the like.

When the controller 4 of the mobile device 1A receives the Set_Interface, it performs an alternative setting corresponding to the alternative setting value within the received information for the interface corresponding to the interface number within the received information (step S308). The controller 4 also notifies the host computer 2 that the transmission of the Set_Interface succeeded (step S309). By doing this, communication corresponding to the requested service is started between the TE and the logical device within the mobile device 1A connected to the port k at step S305 (step S310).

Figure 8A:
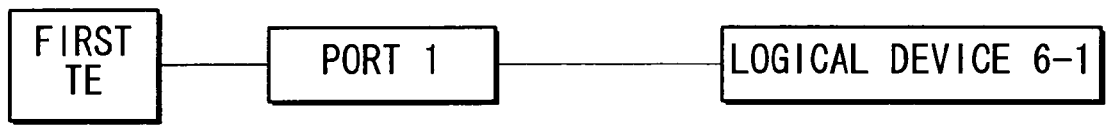
FIG. 8A, FIG. 8B, and FIG. 8C are drawings showing another operational example in the second embodiment.
Figure 8B:
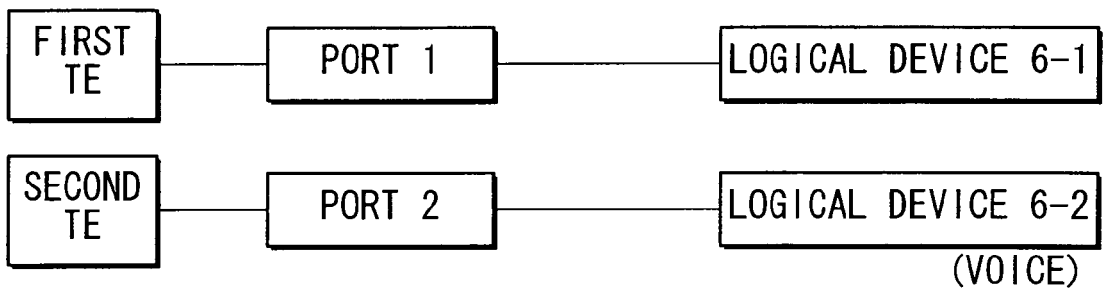

Another operational example of this embodiment is discussed below. In this embodiment, it is possible to use logical devices in a form illustrated in FIG. 8A to FIG. 8C. First, as shown in FIG. 8A, a first TE is connected to the logical device 6-1 via the port 1, and the first TE starts to use the logical device 6-1. Next, as shown in FIG. 8B, a second TE is connected to the logical device 6-2 (for example, a voice communication device) and the second TE starts to use the logical device 6-2. Next, it becomes necessary for the second TE to be switched to FAX communication and, as shown in FIG. 8C, the device connected to the port 2 is changed from the logical device 6-2 to, for example, the logical device 6-3.

FIG. 9 is a sequence diagram showing the communication exchanged between each TE, the host computer 2, and the mobile device 1A in the above-described operational example. In FIG. 9, steps S301 to S310 are the sequence up until the condition shown in FIG. 8A, this procedure having already been described with reference to FIG. 7.

Steps S311 to S319 are the sequence up until the condition shown in FIG. 8B. In this sequence, the second TE, which has previously selected the port 2, requests for voice communication to the host computer 2 so as to connect the logical device 6-2 (voice communication device)to the port 2 between the host computer 2 and the mobile device 1A (steps S312 to S319). These procedures have already been described with reference to FIG. 7.

Figure 8C:
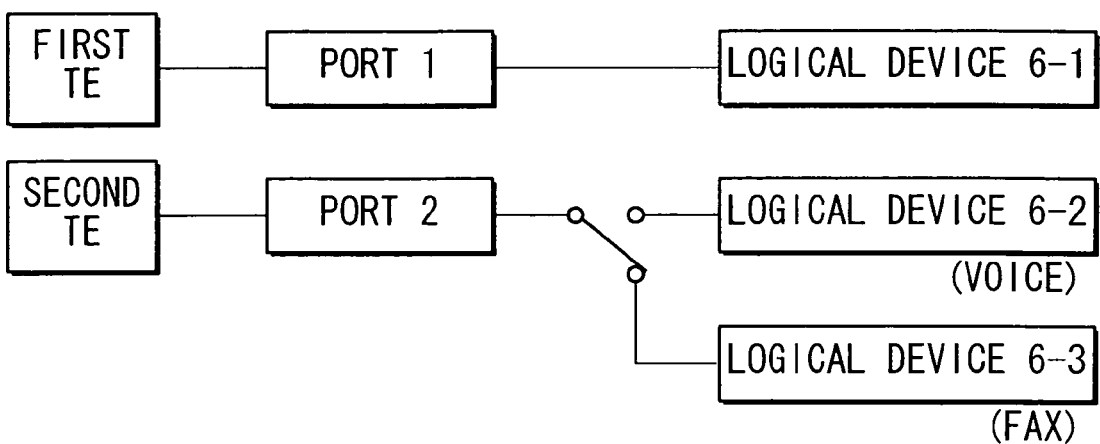

Steps S321 to S329 show the procedure up until the condition shown in FIG. 8C. The switching from voice communication to FAX communication is performed by a control transfer by switching the device connected to the port 2 to the logical device 6-3 (steps S322 to S325) and changing the interface alternative setting to a setting corresponding to FAX communication (step S328).

In this manner, it is possible to switch the device connected to the port 2 without influencing the port 1.

Furthermore, while this embodiment is described for the case in which the host computer 2 makes notification of a desired service to the mobile device 1 and a logical device suitable for the service is selected at the mobile device 1, it is alternatively possible to have the host computer 2 specify a logical device for the mobile device 1.

[3] Third Embodiment

Figure 10:
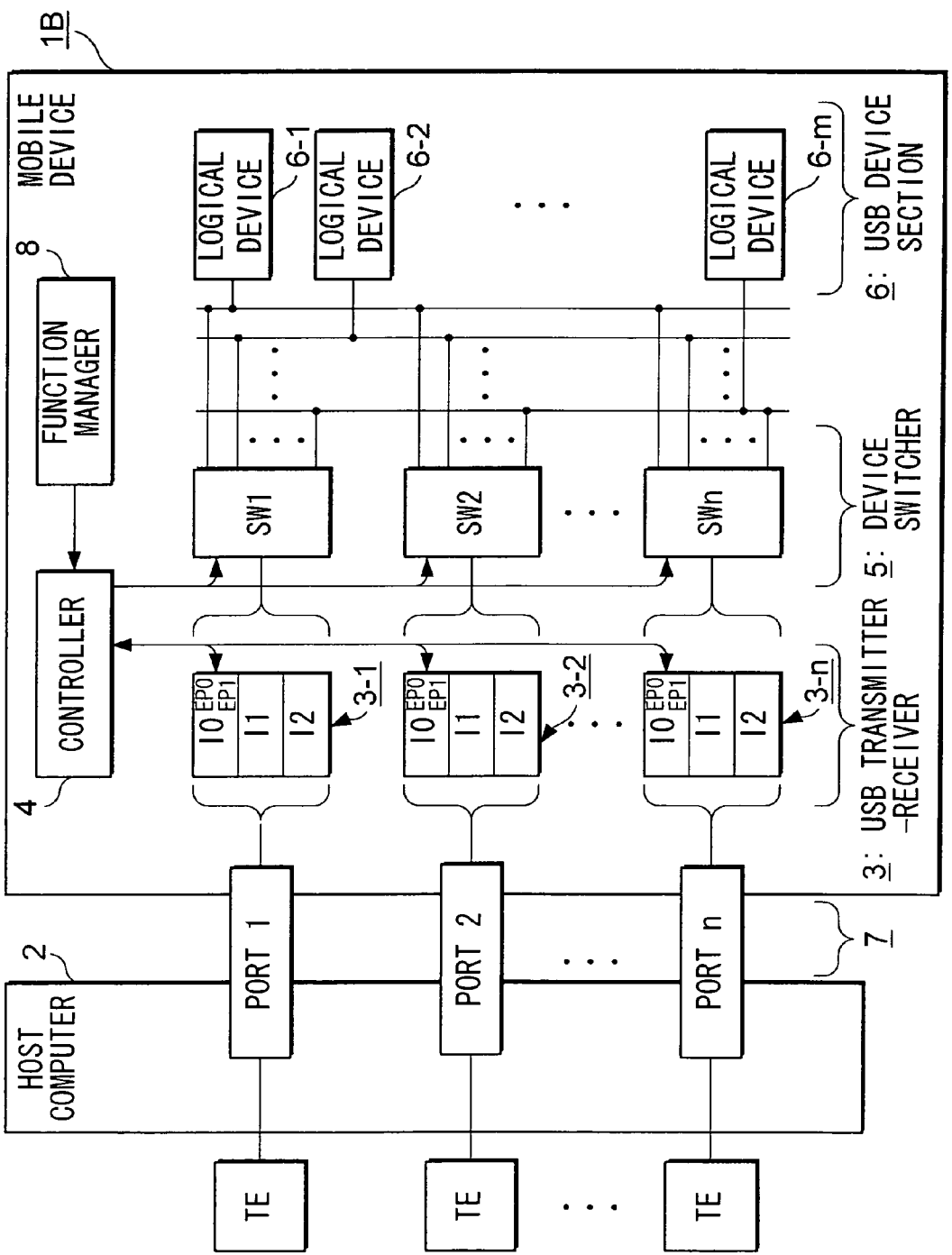
FIG. 10 is a block diagram showing a configuration of a communication system including a mobile device according to a third embodiment of the present invention.

FIG. 10 is a block diagram showing the configuration of a communication system including a mobile device 1B according to a third embodiment of the present invention. In this drawing, parts corresponding to parts in FIG. 5 are assigned the same reference numerals. In this embodiment, EP0 for a control transfer is provided in interface I0 for every port. For this reason, the host computer 2, when performing a setup, performs a control transfer via the EP0 with respect to all ports. The host computer 2 regards that each port is an independent device, and assigns an address to each port of the mobile device 1B. Thus, in this embodiment it is possible to perform the same type of operation as in the first embodiment for each port individually. For this reason, the host computer 2 can simultaneously access to the logical devices 6-1 to 6-mas many as the number of ports (1 to n), and can perform communication corresponding to the service requested by the TE. The mobile device 1B can cause logical devices to simultaneously operate in response to a service request from the host computer 2.

What is claimed is:

1. A mobile device that provides multiple functionalities for a host computer through USB communication, comprising:
a plurality of logical devices that provide different functionalities and are all recognizable under one USB address by the host computer;
a USB that comprises multiple endpoints which collectively provide multiple data transfer functionalities and at least some of which are reconfigurable to provide different data communication capabilities for the logical devices;

a device selector that, in response to a service request from the host computer, dynamically connects one or more endpoints to a logical device adapted to provide the requested service; and an endpoint configuration unit that reconfigures, if necessary, some of the one or more endpoints to effect data communication between the host computer and the selected logical device.

2. A mobile device according to claim 1, wherein the logical devices comprise at least a device selected from a group consisting of a voice communication device, a packet communication device, a telephone directory exchange device, an unlimited digital communication device, a printer and a modem.

3. A mobile device according to claim 1, wherein the endpoints comprise an endpoint for control transfer through which at a setup stage, configurations of the logical devices are informed to the host computer by the mobile device.

4. A mobile device according to claim 1, wherein the service request from the host computer comprises an identification of a service desired by the host computer.

5. A mobile device according to claim 1, wherein the service request from the host computer comprises an identification of a logical device that provides the requested service.

6. A mobile device according to claim 5, further comprising a controller that determines, in response to the service request from the host computer, whether or not the requested logical device is available to serve the host computer.

7. A mobile device according to claim 1, wherein the endpoint configurator reconfigures the endpoints at a request from the host computer.

8. A mobile device according to claim 1, wherein the USB comprises a plurality of USB blocks each connected to the host computer through an assigned port and each connectable to any of the logical devices through an assigned logical device selector.

9. A mobile device according to claim 1, wherein one of the endpoint is adapted specifically for control transfer between the host computer and a controller of the mobile device.

10. A method for providing different functionalities to a host computer through a USB, comprising the steps of:

providing a mobile device with a plurality of logical devices that provide different functionalities and are all recognizable under one USB address by the host computer, wherein the mobile device is connected to the host computer;

notifying the host computer of configurations of the logical devices through a USB that comprises multiple endpoints which collectively provide multiple data transfer functionalities and at least some of which are reconfigurable to provide different data communication capabilities for the logical devices;

receiving a service request from the host computer through the USB;

dynamically connecting one or more endpoints to a logical device adapted to provide the request service; and reconfiguring, if necessary, some of the one or more endpoints to effect data communication between the host computer and the selected logical device.

11. A method according to claim 10, wherein the logical devices comprise at least a device selected from a group consisting of a voice communication device, a packet communication device, a telephone directory exchange device, an unlimited digital communication device, a printer and a modem.

12. A method according to claim 10, wherein the service request from the host computer comprises an identification of a service desired by the host computer.

13. A method according to claim 10, wherein the service request from the host computer comprises an identification of a logical device that provides the requested service.

14. A method according to claim 13, further comprising determining, in response to the service request from the host computer, whether or not the requested logical device is available to serve the host computer.

15. A method according to claim 10, wherein reconfiguring one or more endpoints comprises reconfiguring one or more endpoints at a request from the host computer.

* * * * *

UNITED STATES PATENT AND TRADEMARK OFFICE
CERTIFICATE OF CORRECTION

PATENT NO. : 7,000,035 B1  
APPLICATION NO. : 09/786560  
DATED : February 14, 2006  
INVENTOR(S) : Hideo Uchizono et al.

Page 1 of 1

It is certified that error appears in the above-identified patent and that said Letters Patent is hereby corrected as shown below:

<u>Title page,</u>  
Item [86], PCT No., delete "PCT/JO00/05241" and substitute -- PCT/JP00/05241 --.  
Item [57], ABSTRACT,  
Line 7, delete "selectsas" and substitute -- selects as --.  
Line 9, delete "computer2" and substitute -- computer 2 --.

Signed and Sealed this

Twenty-seventh Day of June, 2006

JON W. DUDAS  
*Director of the United States Patent and Trademark Office*

UNITED STATES PATENT AND TRADEMARK OFFICE
CERTIFICATE OF CORRECTION

| | | |
|---|---|---|
| PATENT NO. | : 7,000,035 B1 | |
| APPLICATION NO. | : 09/786560 | |
| DATED | : February 14, 2006 | |
| INVENTOR(S) | : Hideo Uchizono et al. | |

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by (718) days Delete the phrase "by 718" and insert -- by 621 days--

Signed and Sealed this

Second Day of January, 2007

JON W. DUDAS
*Director of the United States Patent and Trademark Office*